(12) United States Patent
Frutschi

(10) Patent No.: US 6,901,759 B2
(45) Date of Patent: Jun. 7, 2005

(54) METHOD FOR OPERATING A PARTIALLY CLOSED, TURBOCHARGED GAS TURBINE CYCLE, AND GAS TURBINE SYSTEM FOR CARRYING OUT THE METHOD

(75) Inventor: Hans Ulrich Frutschi, Riniken (CH)

(73) Assignee: ALSTOM Technology Ltd., Baden (CH)

( * ) Notice: Subject to any disclaimer, the term of this patent is extended or adjusted under 35 U.S.C. 154(b) by 0 days.

(21) Appl. No.: 10/780,618

(22) Filed: Feb. 19, 2004

(65) Prior Publication Data

US 2004/0163391 A1 Aug. 26, 2004

(30) Foreign Application Priority Data

Feb. 21, 2003 (DE) ......................................... 103 07 374

(51) Int. Cl.⁷ ............................... F02C 6/18; F02C 6/00
(52) U.S. Cl. ..................... 60/772; 60/792; 60/39.183; 60/39.511
(58) Field of Search ................................ 60/612, 39.183, 60/39.182, 39.511, 772–774, 791–792

(56) References Cited

U.S. PATENT DOCUMENTS

| | | | | |
|---|---|---|---|---|
| 2,513,601 A | * | 7/1950 | Traupel | 60/39.183 |
| 2,584,232 A | * | 2/1952 | Sedille | 60/39.17 |
| 2,621,475 A | * | 12/1952 | Loy | 60/774 |
| 2,633,707 A | * | 4/1953 | Hermitte et al. | 60/39.511 |
| 2,758,827 A | * | 8/1956 | Pfenninger | 60/39.511 |
| 3,107,482 A | * | 10/1963 | Fono | 60/616 |
| 3,166,902 A | * | 1/1965 | Meyer et al. | 60/39.511 |
| 3,765,170 A | * | 10/1973 | Nakamura | 60/39.511 |
| 4,392,809 A | * | 7/1983 | Tieberg et al. | 60/39.183 |
| 5,081,832 A | * | 1/1992 | Mowill | 60/792 |
| 5,212,942 A | * | 5/1993 | Malohn | 60/39.511 |
| 5,323,603 A | * | 6/1994 | Malohn | 60/39.183 |
| 5,347,806 A | * | 9/1994 | Nakhamkin | 60/39.511 |
| 5,488,823 A | * | 2/1996 | Faulkner et al. | 60/39.183 |
| 5,778,675 A | * | 7/1998 | Nakhamkin | 60/39.183 |
| 5,932,940 A | | 8/1999 | Epstein et al. | |
| 6,526,757 B2 | * | 3/2003 | Mackay | 60/773 |

FOREIGN PATENT DOCUMENTS

| | | | | |
|---|---|---|---|---|
| DE | 10060690 | | 6/2002 | ......... F02B/37/007 |
| GB | 0529786 A | | 5/1939 | |

OTHER PUBLICATIONS

Search Report from DE 103 07 374.4 (Aug. 28, 2003).
Search Report from GB 0403740.4 (Jun. 17, 2004).
Malmquist, Anders, et al., "Microturbines: speeding the shift to distributed heat and power", ABB Review, pp 22–30 (Mar. 2003, ABB, Baden, Switzerland).

* cited by examiner

*Primary Examiner*—Thai-Ba Trieu
(74) *Attorney, Agent, or Firm*—Cermak & Kenealy, LLP; Adam J. Cermak

(57) ABSTRACT

A gas turbine system includes a gas turbine (1, 2, 3) having a compressor (1) and a turbine (2), which via a common shaft (3) drive a generator (4), and a combustion chamber (6), the exit of which is connected to the entry to the turbine (2) of the gas turbine (1, 2, 3), has a fuel feed (8) and receives combustion air from the exit of the compressor (1) of the gas turbine (1, 2, 3) via the high-pressure side of a recuperator (5), the exit of the turbine (2) and the entry to the compressor (1) of the gas turbine (1, 2, 3) being connected via the low-pressure side of the recuperator (5), and a first exhaust-gas turbocharger (ATL2) which sucks in air being connected to different locations (9, 10) of the low-pressure side of the recuperator (4) via the exit of its compressor (13) and the entry to its turbine (14).

22 Claims, 2 Drawing Sheets

METHOD FOR OPERATING A PARTIALLY CLOSED, TURBOCHARGED GAS TURBINE CYCLE, AND GAS TURBINE SYSTEM FOR CARRYING OUT THE METHOD

This application claims priority to German application no. 103 07 374.4, filed 21 Feb. 2003, the entirety of which is incorporated by reference herein.

BACKGROUND OF THE INVENTION

1. Field of the Invention

The present invention deals with the field of gas turbine technology. It relates to a method for operating a partially closed, turbocharged gas turbine cycle, and to a gas turbine system for carrying out the method.

2. Discussion of Background

It is known that gas turbines for performing work can be constructed on the basis of turbochargers, as are used, for example, to turbocharge internal combustion engines. One such example is the microturbines (of type MT100) which have been available for some years from ABB-Energie-Services, with an electrical power of 100 kW, which are intended to serve as small combined heat and power generation installations (cf. Schweizerische Technische Zeitschrift STZ No. 4/2002, pages 38 to 40 or ABB Review 3/2000, pp. 22–30).

Since gas turbines designed in this way have at most moderately cooled turbines, the hot-gas temperature which acts on the turbine and is generated by the combustion of a fuel in the combustion chamber arranged between compressor and turbine cannot meet the very high standard set by modern gas turbine construction. Accordingly, to achieve any worthwhile level of efficiency of power generation, it is necessary to incorporate a recuperator, as is the case with the abovementioned microturbine MT100. In the recuperator, heat is extracted from the hot turbine exhaust gases and used to heat the compressed combustion air before it enters the combustion chamber. This makes it possible to expect of efficiency of at least 30%.

Gas turbines constructed in this way result in a poor performance with regard to part-load efficiency, since the radial compressors used in turbochargers do not allow the intake mass flow to be controlled unless the throttling method, which is subject to very high levels of losses, were to be used. Consequently, the power has to be controlled by changing the turbine inlet temperature, which is highly unfavorable in terms of exergy.

A further drawback of a cycle configuration with a recuperator of this nature is firstly the low optimum pressure ratio with regard to efficiency, resulting in a low specific power based on the air flow. Secondly, the heat transfer on the low-pressure side of the recuperator is low, since the turbine exhaust gas is at only barometer pressure.

An unpublished earlier application in the name of the same Applicant has proposed a partially closed, turbocharged gas turbine cycle for conventional large gas turbines, in which an exhaust-gas turbocharger is connected on the low-pressure side of the recuperator, removes a partial stream from the cycle at a first suitable temperature level of the recuperator and expands it in the turbine of the exhaust-gas turbocharger, and also compresses intake ambient air in the turbine of the exhaust-gas turbocharger and feeds it to the cycle at a second suitable temperature level of the recuperator.

SUMMARY OF THE INVENTION

Accordingly, one object of the invention is to provide a novel gas turbine cycle which is suitable for small combined heat and power generation installations, as well as a gas turbine system which is suitable for it.

An aspect of the invention involves using a gas turbine in the manner of an exhaust-gas turbocharger having a radial compressor as power-generating gas turbine in a partially closed, turbocharged cycle.

It is preferable for the gas turbine used to be either a second exhaust-gas turbocharger or a microturbine. Known microturbines can in this case be considered as configurations derived from exhaust-gas turbochargers.

Preferably, the fraction of the working medium which is removed at the removal location is expanded in such a manner in the turbine of the first exhaust-gas turbocharger that the power required to drive the compressor of the first exhaust-gas turbocharger is produced. To achieve this, the working medium to act on the charging turbine is removed from the recuperator on the low-pressure side at a location where the temperature level is just sufficient. In particular, the quantity of air supplied to the working medium by the compressor of the first exhaust-gas turbocharger covers at least the demand for combustion air in the combustion chamber.

A preferred configuration of the method according to the invention is distinguished by the fact that heat is extracted from the working medium in a precooler between the low-pressure-side exit from the recuperator and the entry to the compressor of the gas turbine. This heat can be used at least partially for heating purposes.

Another configuration is characterized in that the rotational speed of the first exhaust-gas turbocharger is controlled by means of an auxiliary machine which is connected to the first exhaust-gas turbocharger and in particular takes the form of an electrical machine connected to the grid system via converters, in order to set the level of turbocharging.

It is also conceivable for the rotational speed of the first exhaust-gas turbocharger to be controlled by an adjustable bypass between the compressor and the turbine of the first exhaust-gas turbocharger in order to set the level of turbocharging. Throttling and/or blow-off are also conceivable.

A widened version of the method according to the invention is characterized in that the working medium which comes out of the compressor of the gas turbine is compressed further in the compressor of a third exhaust-gas turbocharger before it enters the recuperator, and in that the working medium which flows out of the combustion chamber is initially expanded in the turbine of the third exhaust-gas turbocharger before it enters the turbine of the gas turbine, in which case the working medium is cooled in an intercooler before it enters the compressor of the third exhaust-gas turbocharger. In addition, the exhaust gas from the turbine of the third exhaust-gas turbocharger can be reheated in a second combustion chamber before it enters the turbine of the second exhaust-gas turbocharger.

A preferred configuration of the gas turbine system according to the invention is distinguished by the fact that a precooler is arranged between the entry to the compressor of the gas turbine and the low-pressure-side exit from the recuperator, that the first exhaust-gas turbocharger can be driven by an auxiliary machine, in particular in the form of an electrical machine connected to the grid system via converters, and that a bypass valve is arranged between the exit from the compressor and the entry to the turbine of the first exhaust-gas turbocharger. However, it is also possible for a blow-off member to be provided downstream of the charger or a throttling of the charger. It is particularly important for the low-pressure side of the recuperator to be tapped at a location where the temperature level is just sufficient to be applied to the charging turbine, it being possible to control the tapping.

In particular, a third exhaust-gas turbocharger is arranged between the gas turbine and the high-pressure side of the recuperator, in such a manner that the compressor of the third exhaust-gas turbocharger may be arranged between the exit from the compressor of the gas turbine and the high-pressure-side entry of the recuperator, and the turbine of the third exhaust-gas turbocharger is arranged between the entry to the turbine of the gas turbine and the exit from the combustion chamber. Furthermore, an intercooler may be arranged between the exit from the compressor of the gas turbine and the entry to the compressor of the third exhaust-gas turbocharger. Likewise, a further combustion chamber may be arranged downstream of the turbine of the third exhaust-gas turbocharger.

Further configurations will emerge from the dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
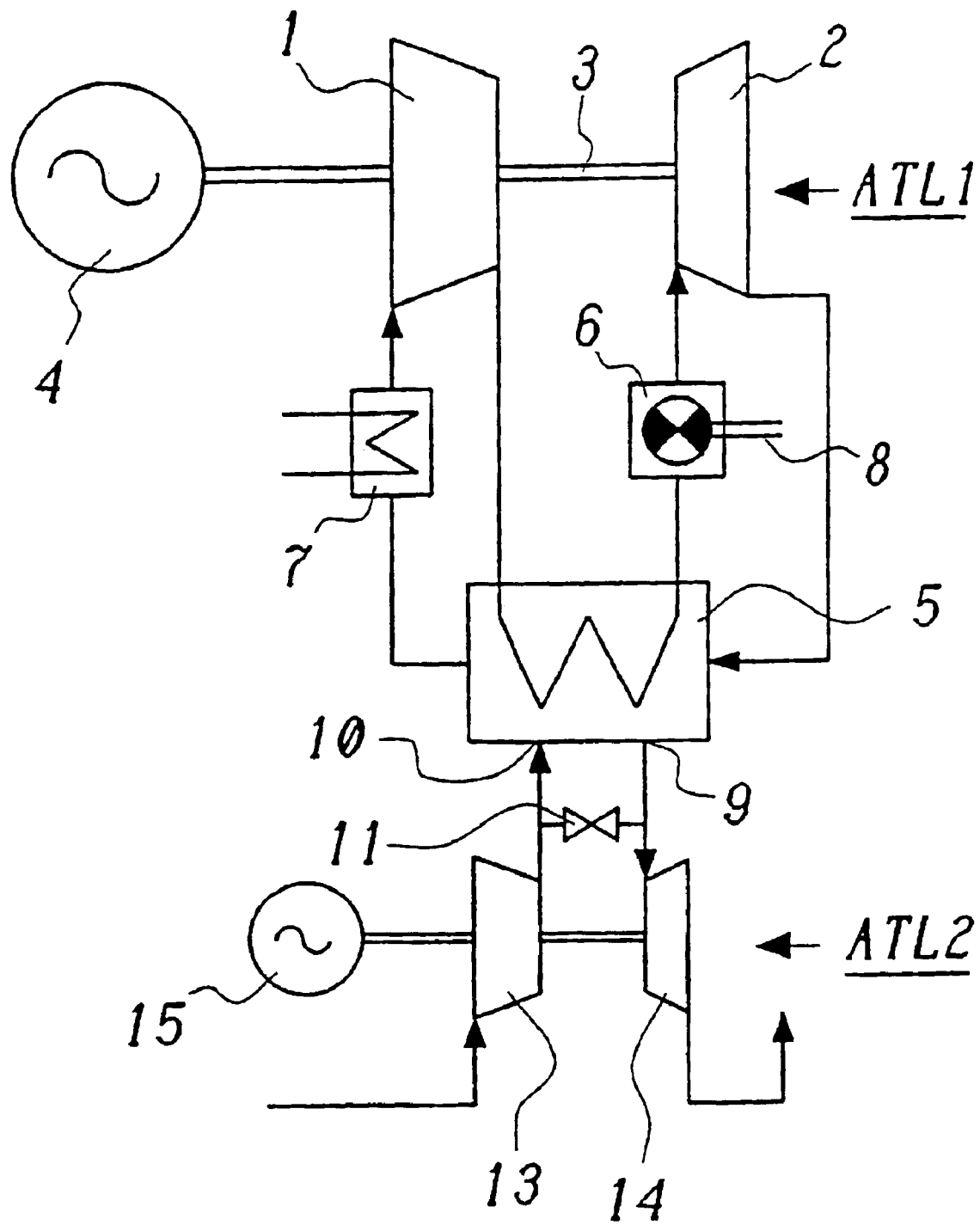
FIG. 1 shows a simplified circuit diagram of a partially closed, turbocharger gas turbine cycle or system in accordance with a first exemplary embodiment of the invention with two exhaust-gas turbochargers.

Referring now to the drawings, wherein like reference numerals designate identical or corresponding parts throughout the several views, FIG. 1 shows a simplified circuit diagram of a partially closed, turbocharged gas turbine cycle or system in accordance with a first exemplary embodiment of the invention with two exhaust-gas turbochargers. A gas turbine in the form of a first exhaust-gas turbocharger ATL1 has a compressor 1 and a turbine 2 on a common shaft 3 connected to a generator 4. The combustion air compressed by the compressor 1 is used in a combustion chamber 6 for combustion of a fuel which is supplied via a fuel feed 8, and the hot fuel gases are then expanded in the turbine 2 so as to perform work. The exhaust gas is returned from the exit of the turbine 2, via the low-pressure side of a recuperator 5 and a precooler 7, to the entry to the compressor 1. The gas turbine cycle which is formed as a result via the recuperator 5 and the precooler 7 is, however, at most partially closed, with a second exhaust-gas turbocharger ATL2 being responsible for turbocharging the process. The quantity of air which is introduced into the gas turbine cycle by the compressor 13 of the second exhaust-gas turbocharger ATL2 is intended to at least cover the demand for combustion air in the combustion chamber 6, which corresponds to a quarter of the quantity circulating in the machines 1 and 2. The exhaust gases which are formed as a result of the combustion are expanded by the turbine 14 of the second exhaust-gas turbocharger ATL2, so that the power required to drive the compressor 13 is produced.

To supply the second exhaust-gas turbocharger ATL2 with precisely the amount of energy required for its full-load operation, the quantity of flue gas required for the turbine 14 should be removed from the low-pressure side of the recuperator 5 at a removal location 9 at which the required temperature level is just present. The compressor 13 of the second exhaust-gas turbocharger ATL2 should likewise feed the compressed air to the recuperator 5 in its low-pressure side at a feed location 10 at which precisely the compressor outlet temperature is present. Of course, this is only possible if the outlet temperature from the charging compressor exceeds that of the gas turbine compressor by more than the temperature change in the recuperator 5, which can be achieved in accordance with FIG. 2.

A gas turbine configured in this way has the following advantages over the prior art:

Firstly, the degree of turbocharging allows part-load operation without the hot-gas temperature upstream of the turbine 2 having- to be reduced, which keeps efficiency high even under part-load. To lower the degree of turbocharging, it is possible, for example, to reduce the rotational speed of an electrical machine 15 which is coupled to the second exhaust-gas turbocharger ATL2 and is connected to the grid system via converters, resulting in a reduction in the rotational speed of the second exhaust-gas turbocharger ATL2 and an associated drop in the air stream which is delivered. However, the rotational speed of the second exhaust-gas turbocharger ATL2 can also be used by partially opening a bypass valve 11.

Secondly, the turbocharging of the gas turbine cycle significantly improves the heat transfer coefficients in the recuperator 5, for example pressure high 0.75, i.e. for example at 4 bar on the low-pressure side almost by a factor of 3. The required exchange surface area for the heat output to be exchanged is reduced by the same ratio. The same also applies, of course, to the precooler 7, which serves to discharge the waste heat extracted for heating purposes and as far as possible to recool the cycle gas or working medium on entry to the compressor 1.

Figure 2:
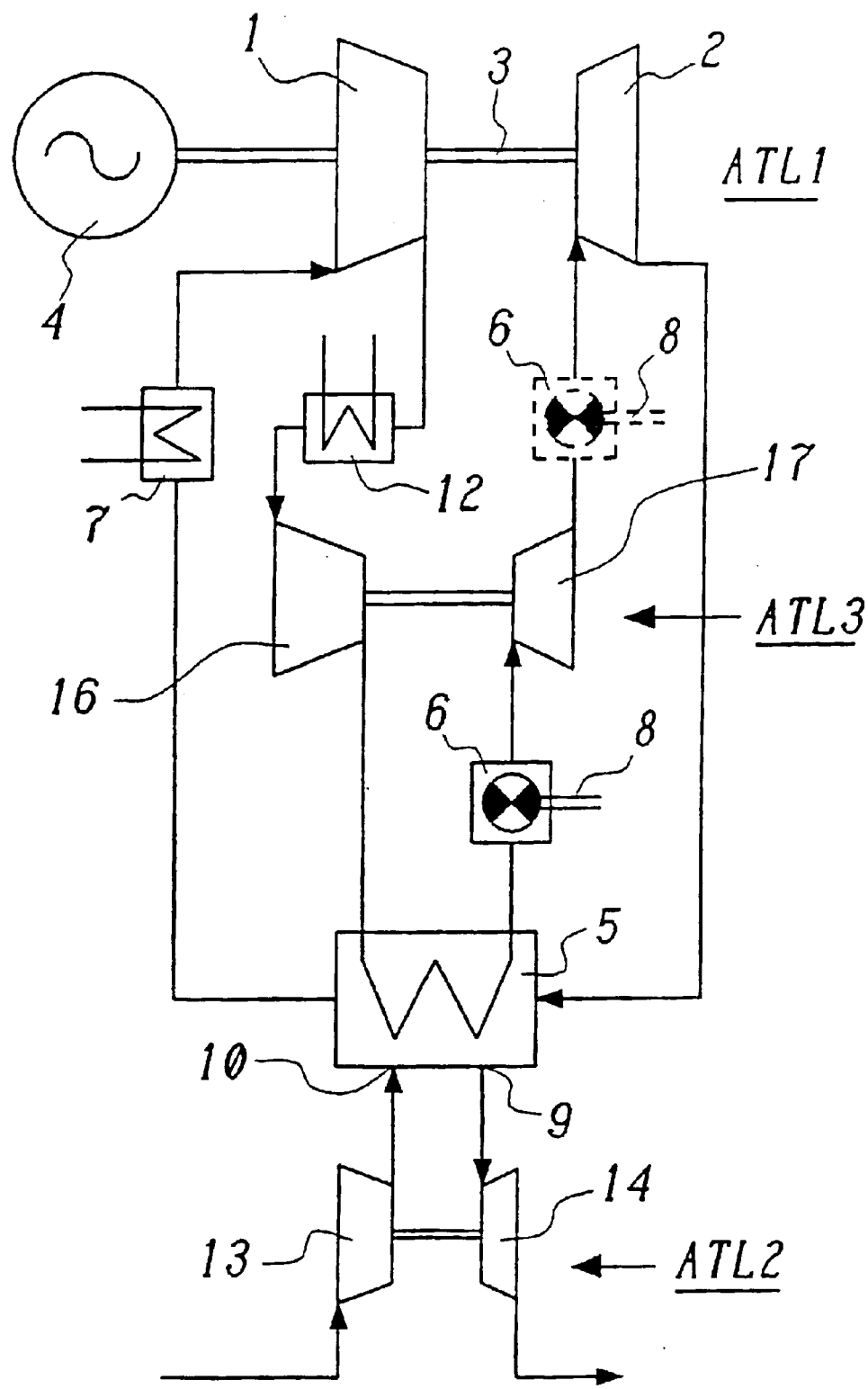
FIG. 2 shows a simplified circuit diagram of a partially closed, turbocharged gas turbine cycle or system in accordance with a second exemplary embodiment of the invention with three exhaust-gas turbochargers.

FIG. 2 shows the circuit diagram of a widened second exemplary embodiment. In this case, a third exhaust-gas turbocharger ATL3 is arranged between the first exhaust-gas turbocharger ATL1 and the recuperator 5. The compressor 16 of the third exhaust-gas turbocharger ATL3 is located between the exit from the compressor 1 and the high-pressure-side entry to the recuperator 5. An intercooler 12 is provided in the connecting line. The turbine 17 of the third exhaust-gas turbocharger ATL3 is arranged between the exit from the combustion chamber 6 and the entry to the turbine 2. At least three exhaust-gas turbochargers ATL1, . . . ATL3 of different size are used to construct an installation of this type. Exhaust-gas turbocharger ATL2 has approximately the same volumetric flow as the exhaust-gas turbocharger ATL1, which in the case of turbocharging to 4 bar results in approximately a quarter of the cycle flow as charge air quantity. The dimensions of the exhaust-gas turbocharger ATL3 are smaller by approximately a factor of 2.

Finally, in the case of the installation illustrated in FIG. 2, it is conceivable for the exhaust gas from the turbine 17 of the third exhaust-gas turbocharger ATL3 to be reheated in a downstream second combustion chamber 6' (indicated by dashed lines in FIG. 2).

Partially, closed turbocharged gas turbine systems of this nature are predominantly suitable for burning clean fuels, such as for example natural gas. In terms of the quantity structure required, their output is greater by the degree of turbocharging than generator gas turbines which are not turbocharged. Accordingly, the specific installation costs based on the power output should be lower.

Obviously, numerous modifications and variations of the present invention are possible in light of the above teachings. It is therefore to be understood that within the scope of the appended claims, the invention may be practiced otherwise than as specifically described herein.

LIST OF DESIGNATIONS

1 Compressor
2 Turbine
3 Shaft
4 Generator
5 Recuperator
6, 6' Combustion chamber
7 Precooler
8 Fuel feed
9 Removal location
10 Feed location
11 Bypass valve
12 Intercooler
13, 16 Compressor
14, 17 Turbine
15 Electrical machine
100, 200 Gas turbine system
ATL1, . . . ATL3 Exhaust-gas turbocharger

What is claimed is:

1. method for operating a partially closed, turbocharged gas turbine cycle, the method comprising:
   burning fuel in a combustion chamber while supplying a gaseous, compressed working medium which contains combustion air, to generate hot combustion gases;
   expanding a working medium which contains the hot combustion gases in a turbine of a gas turbine, said turbine performing work;
   extracting heat from the expanded working medium in a downstream recuperator to generate cooled working medium;
   compressing the cooled working medium in a compressor of the gas turbine;
   feeding heat to the compressed working medium in the recuperator before said compressed working medium re-enters the combustion chamber;
   removing a portion of the expanded working medium on a low-pressure side of the recuperator at a removal location which is at a first temperature level, and further expanding said removed expanded working medium portion in the turbine of a first exhaust-gas turbocharger;
   sucking in and compressing air with a compressor of the first exhaust-gas turbocharger; and
   feeding the compressed air to the working medium on the low-pressure side of the recuperator at a feed location which is at a second temperature level;
   wherein said gas turbine compressor comprises a radical compressor.

2. The method as claimed in claim 1, wherein said gas turbine comprises a second exhaust-gas turbocharger.

3. The method as claimed in claim 2, further comprising:
   compressing the working medium which comes out of the compressor of the gas turbine in the compressor of a third exhaust-gas turbocharger before said working medium enters the recuperator; and
   initially expanding the working medium which flows out of the combustion chamber in the turbine of the third exhaust-gas turbocharger before said working medium enters the turbine of the gas turbine.

4. The method as claimed in claim 3, further comprising:
   cooling the working medium in an intercooler before said working medium enters the compressor of the third exhaust-gas turbocharger; and
   reheating the exhaust gas from the turbine of the third exhaust-gas turbocharger in a further combustion chamber.

5. The method as claimed in claim 1, wherein said gas turbine comprises a microturbine.

6. The method as claimed in claim 1, further comprising:
   expanding said removed expanded working medium portion in the turbine of the first exhaust-gas turbocharger so that the power required to drive the compressor of the first exhaust-gas turbocharger is produced.

7. The method as claimed in claim 1, wherein the quantity of air supplied to the working medium by the compressor of the first exhaust-gas turbocharger at least covers the demand for combustion air in the combustion chamber.

8. The method as claimed in claim 1, wherein the second temperature level approximately corresponds to the compressor outlet temperature.

9. The method as claimed in claim 1, further comprising:
   extracting heat from the working medium in a precooler between low-pressure-side exit from the recuperator and the entry to the compressor of the gas turbine.

10. The method as claimed in claim 1, further comprising:
    controlling the rotational speed of the first exhaust-gas turbocharger with an auxiliary machine connected to the first exhaust-gas turbocharger to set the level of turbo charging.

11. The method as claimed in claim 10, wherein the auxiliary machine comprises an electrical machine, converters, and a grid system, the electrical machine connected to the grid system via the converters.

12. The method as claimed in claim 1, further comprising:
    controlling the rotational speed of the first exhaust-gas turbocharger with an adjustable bypass between the compressor and the turbine of the first exhaust-gas turbocharger, in order to set the level of turbo charging.

13. A gas turbine system useful for carrying out the method as claimed in claim 1, the system comprising:
    a generator;
    a common shaft;
    a gas turbine having a compressor and a turbine which drive the generator via the common shaft, the turbine having an entry and an exit, a recuperator having a high-pressure side and a low-pressure side, and a combustion chamber having an exit connected to the entry to the turbine of the gas turbine, the compressor having an exit, a fuel feed, and being configured and arranged to receive combustion air from the exit of the compressor of the gas turbine via the high-pressure side of the recuperator, the exit of the turbine and the entry to the compressor of the gas turbine being connected via the low-pressure side of the recuperator; and
    a first exhaust-gas turbocharger, configured and arranged to suck in air, including a compressor having an exit and a turbine having an entry, the first exhaust-gas turbocharger being connected to locations of the low-pressure side of the recuperator by the exit of the compressor of the first exhaust-gas turbocharger and the entry to the turbine of the first exhaust-gas turbocharger;

wherein the compressor of the gas turbine comprises a radial compressor.

14. The gas turbine system as claimed in claim 13, wherein the gas turbine comprises a second exhaust-gas turbocharger.

15. The gas turbine system as claimed in claim 13, wherein the gas turbine comprises a microturbine.

16. The gas turbine system as claimed in claim 13, further comprising:
a precooler configured and arranged to discharge heating heat, arranged between the entry to the compressor of the gas turbine and the low-pressure side exit of the recuperator.

17. The gas turbine system as claimed in claim 13, wherein the first exhaust-gas turbocharger configured and arranged to be driven by an auxiliary machine.

18. The gas turbine system as claimed in claim 17, wherein the auxiliary machine comprises an electrical machine, converters, and a grid system, the electrical machine connected to the grid system via the converters.

19. The gas turbine system as claimed in claim 13, further comprising a bypass valve arranged between the exit from the compressor and the entry to the turbine of the first exhaust-gas turbocharger.

20. The gas turbine system as claimed in claim 13, further comprising:
a third exhaust-gas turbocharger having a compressor and a turbine and being arranged between the gas turbine and the high-pressure side of the recuperator so that the compressor of the third exhaust-gas turbocharger is arranged between the exit from the compressor of the gas turbine and the high-pressure-side entry of the recuperator, and the turbine of the third exhaust-gas turbocharger is arranged between the entry to the turbine of the gas turbine and the exit from the combustion chamber.

21. The gas turbine system as claimed in claim 20, wherein the compressor of the third exhaust gas turbocharger has an entry, and further comprising:
an intercooler arranged between the exit from the compressor of the gas turbine and the entry to the compressor of the third exhaust-gas turbocharger; and
a further combustion chamber arranged between the turbine of the third exhaust-gas turbocharger and the turbine of the gas turbine.

22. The gas turbine system as claimed in claim 20, wherein the mass flow in the first exhaust-gas turbocharger is approximately a quarter of the mass flow in the second exhaust-gas turbocharger, and the third exhaust-gas turbocharger is configured and arranged for approximately half the volumetric flow of the gas turbine.

* * * * *